United States Patent
Usuba et al.

(10) Patent No.: US 9,684,958 B2
(45) Date of Patent: Jun. 20, 2017

(54) IMAGE PROCESSING DEVICE, PROGRAM, IMAGE PROCESSING METHOD, COMPUTER-READABLE MEDIUM, AND IMAGE PROCESSING SYSTEM

(71) Applicant: FUJI XEROX CO., LTD., Tokyo (JP)

(72) Inventors: Ryoko Usuba, Yokohama (JP); Noriji Kato, Yokohama (JP); Ryota Ozaki, Yokohama (JP); Yukio Kumazawa, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 238 days.

(21) Appl. No.: 14/403,877

(22) PCT Filed: Mar. 29, 2013

(86) PCT No.: PCT/JP2013/059677
§ 371 (c)(1),
(2) Date: Nov. 25, 2014

(87) PCT Pub. No.: WO2014/030379
PCT Pub. Date: Feb. 27, 2014

(65) Prior Publication Data
US 2015/0138334 A1   May 21, 2015

(30) Foreign Application Priority Data
Aug. 23, 2012 (JP) ................. 2012-184105

(51) Int. Cl.
*G06T 7/40* (2017.01)
*G06T 7/00* (2017.01)
(Continued)

(52) U.S. Cl.
CPC .......... *G06T 7/0012* (2013.01); *G02B 21/365* (2013.01); *G06K 9/0014* (2013.01);
(Continued)

(58) Field of Classification Search
CPC ............ G02B 21/365; G06K 9/00127; G06K 9/0014; G06K 9/00147; G06T 7/40
(Continued)

(56) References Cited

U.S. PATENT DOCUMENTS

| 4,761,075 A | 8/1988 | Matsushita et al. |
| 2004/0252876 A1 | 12/2004 | Wong et al. |

(Continued)

FOREIGN PATENT DOCUMENTS

| CN | 101042772 A | 9/2007 |
| CN | 101127839 A | 2/2008 |

(Continued)

OTHER PUBLICATIONS

Written Opinion (PCT/ISA/237) issued Jun. 11, 2013, in related International Application No. PCT/JP2013/059677.
(Continued)

*Primary Examiner* — Behrooz Senfi
(74) *Attorney, Agent, or Firm* — Sughrue Mion, PLLC

(57) ABSTRACT

An image processing device 20 acquires captured images obtained by imaging a sample including a target cell, performs machine learning based on a first image feature quantity, sets a plurality of object regions for detecting the target cell in the captured images, and displays the plurality of object regions in an order determined based on the first image feature quantity of each of the plurality of object regions. The image processing device 20 calculates a second image feature quantity in each of the plurality of object regions, sorts the plurality of displayed object regions in an order of the second image feature quantity similar to the second image feature quantity of a reference object region selected from among the plurality of object regions, and displays the plurality of object regions.

9 Claims, 14 Drawing Sheets

(51) Int. Cl.
  *G02B 21/36* (2006.01)
  *G06K 9/00* (2006.01)
(52) U.S. Cl.
  CPC ..... *G06K 9/00127* (2013.01); *G06K 9/00147* (2013.01); *G06T 7/40* (2013.01); *G06T 2207/10024* (2013.01); *G06T 2207/10056* (2013.01); *G06T 2207/30024* (2013.01)
(58) Field of Classification Search
  USPC ............................................ 348/79; 382/134
  See application file for complete search history.

(56) References Cited

U.S. PATENT DOCUMENTS

| 2010/0169811 | A1 | 7/2010 | Yamada |
| 2010/0183216 | A1* | 7/2010 | Yamada ............. G01N 15/1475 382/134 |
| 2013/0212053 | A1 | 8/2013 | Yagi et al. |

FOREIGN PATENT DOCUMENTS

| EP | 2 202 506 A2 | 6/2010 |
| EP | 2 211 165 A2 | 7/2010 |
| JP | 2004248619 A * | 9/2004 | ............. C12M 1/34 |
| JP | 2009-009290 A | 1/2009 |
| JP | 4346923 A | 10/2009 |
| JP | 2010-151647 A | 7/2010 |
| JP | 2011-221841 A | 11/2011 |
| WO | 2012053188 A1 | 4/2012 |

OTHER PUBLICATIONS

ISR (PCT/ISA/210) issued Jun. 11, 2013, in related International Application No. PCT/JP2013/059677.

Office Action issued on Nov. 24, 2015 by the State Intellectual Property Office of P.R. China in counterpart Chinese Application No. 201380038145.4.

Written Opinion dated Jun. 11, 2013, issued by the International Searching Authority in counterpart International Application No. PCT/JP2013/059677.

Search Report dated Mar. 23, 2016 issued by the European Patent Office in counterpart European Patent Application No. 13830325.0.

Mui et al; "Automated Classification of Nucleated Blood Cells Using a Binary Tree Classifier"; IEEE Transactions on Pattern Analysis and Machine Intelligence; vol. PAMI-2; No. 5; Sep. 1980; pp. 429-443.

* cited by examiner

FIG. 4A
FIG. 4B
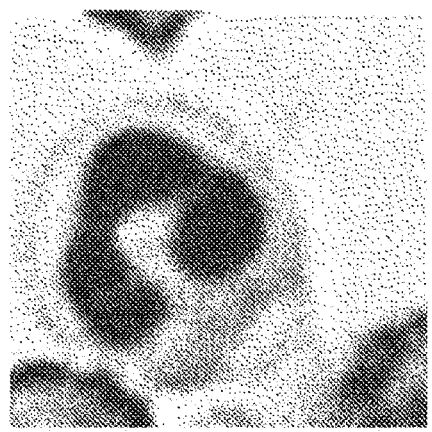
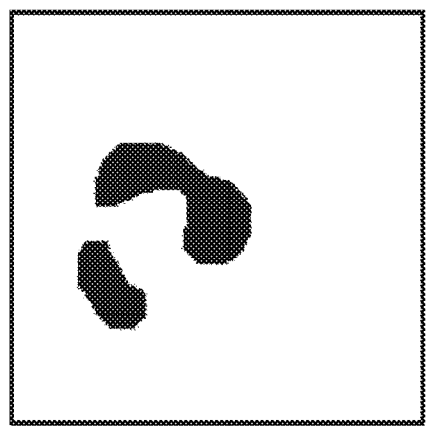
FIG. 4C
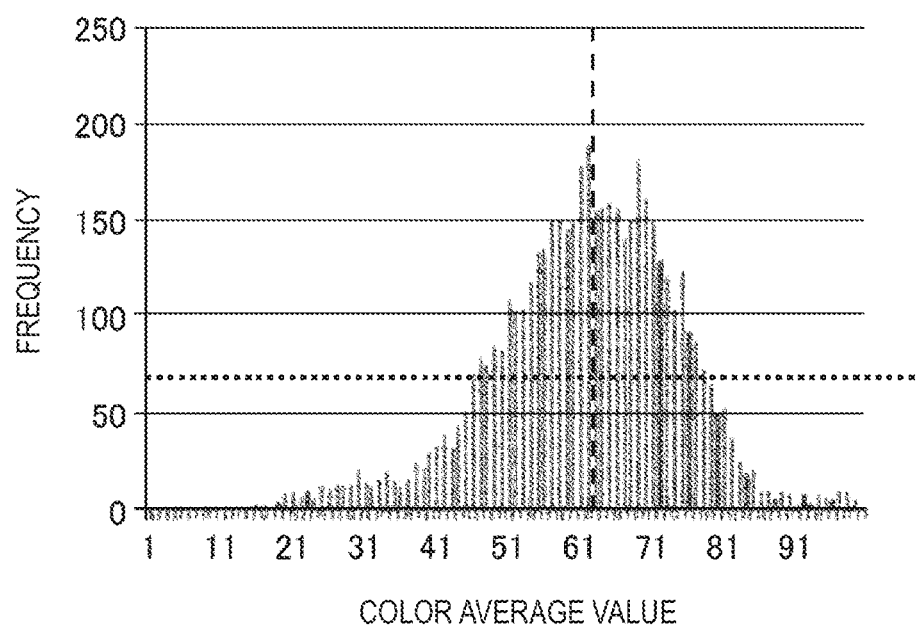

FIG. 5A
FIRST FEATURE OF QUANTITY
(ADDITIONAL FEATURE QUANTITY)
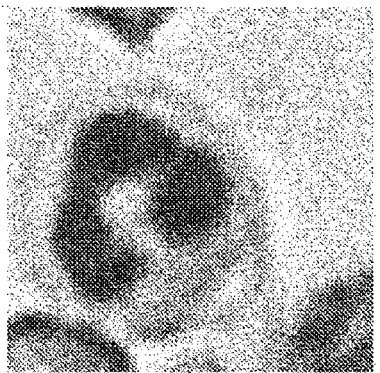
↓ BINARIZATION/DENOISING
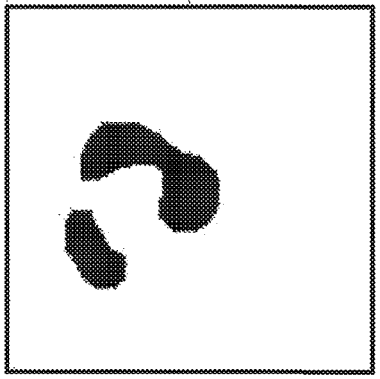
FIG. 5B
FIRST FEATURE OF QUANTITY
(ADDITIONAL FEATURE QUANTITY)
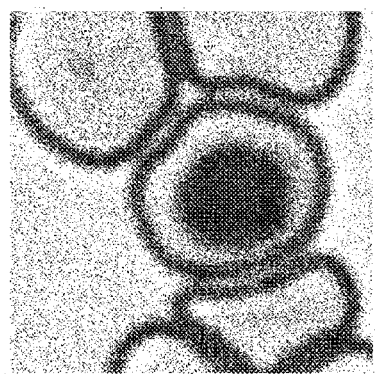
↓ BINARIZATION/DENOISING
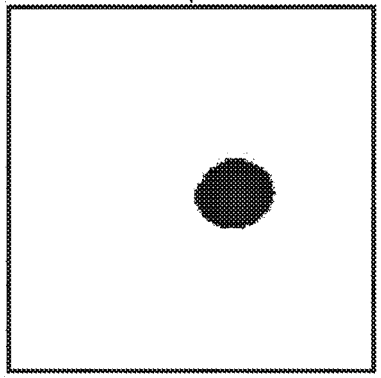

FIG. 5C
FIRST FEATURE OF QUANTITY
(ADDITIONAL FEATURE QUANTITY)
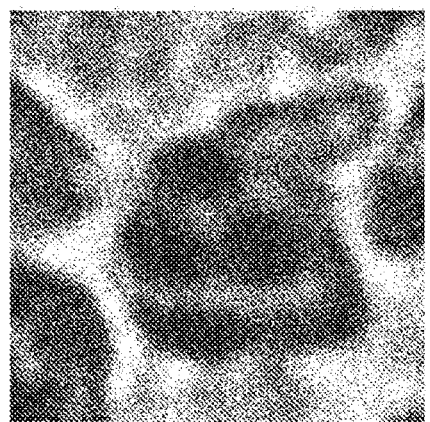
BINARIZATION/DENOISING
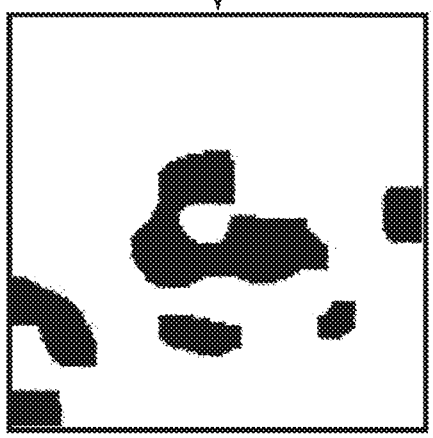

SECOND FEATURE QUANTITY
(ADDITIONAL FEATURE QUANTITY)

CANDIDATE REGION
BLOCK REGION

SECOND FEATURE QUANTITY
(ADDITIONAL FEATURE QUANTITY)

CANDIDATE REGION
BLOCK REGION

SECOND FEATURE QUANTITY
(ADDITIONAL FEATURE QUANTITY)

CANDIDATE REGION
BLOCK REGION

THIRD FEATURE QUANTITY
(ADDITIONAL FEATURE QUANTITY)

THIRD FEATURE QUANTITY
(ADDITIONAL FEATURE QUANTITY)

FIG. 12
LIST DISPLAY SCREEN (AFTER SORTING)
0005
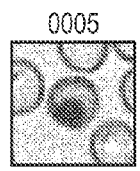
REFERENCE CANDIDATE IMAGE: SIMILAR IMAGES OF 0005 ARE DISPLAYED
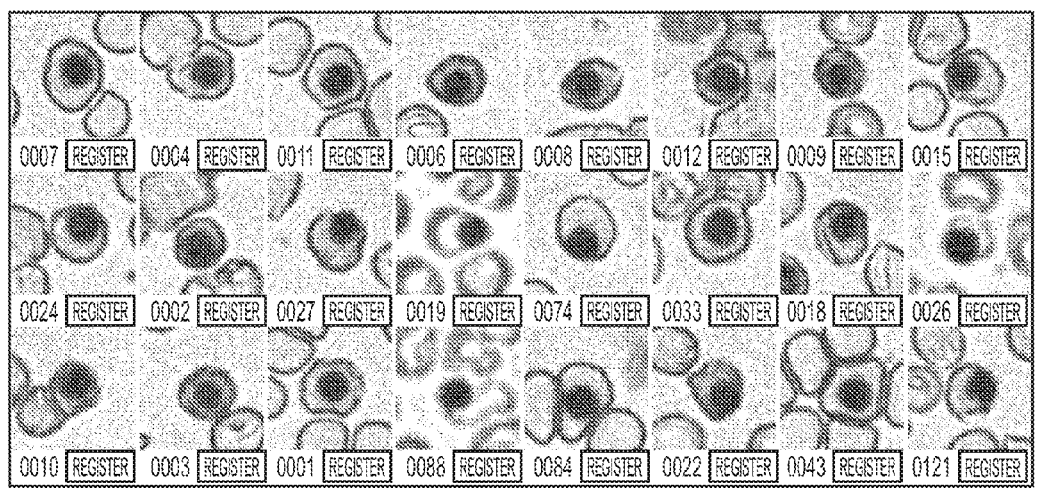

IMAGE PROCESSING DEVICE, PROGRAM, IMAGE PROCESSING METHOD, COMPUTER-READABLE MEDIUM, AND IMAGE PROCESSING SYSTEM

TECHNICAL FIELD

The present invention relates to an image processing device, a program, an image processing method, a computer-readable medium, and an image processing system.

BACKGROUND ART

Patent Literature 1 describes a technique in which cells satisfying the conditions of the color, shape, positional relationship, area ratio, and the like of NRBCs are searched from object images, thereby mechanically detecting NRBCs.

CITATION LIST

Patent Literature

Patent Literature 1: Japanese Patent No. 4346923

SUMMARY OF INVENTION

Technical Problem

An object of the invention is to provide an image processing device, a program, and an image processing system which easily confirm a candidate region similar to a reference candidate region in a feature to be not mechanically learned among a plurality of candidate regions of a target cell.

Solution to Problem

[1] According to an aspect of the invention, it provides an image processing device including: an acquisition unit that acquires captured images obtained by imaging a sample including a target cell; a unit that mechanically learns a condition for identifying the target cell based on a first image feature quantity calculated in a sample image corresponding to each of a positive example and a negative example of the target cell; a setting unit that sets a plurality of object regions for detecting the target cell in the captured images; a first display control unit that performs display control of the plurality of object regions in an order determined based on the first image feature quantity of each of the plurality of object regions; a calculation unit that calculates a second image feature quantity different from the first image feature quantity in the plurality of object regions; and a second display control unit that sorts the plurality of displayed object regions in an order of a second image feature quantity similar to a second image feature quantity of a reference object region selected from among the plurality of object regions and performs display control of the plurality of object regions.

[2] The image processing device according to [1], may further include: a reception unit that receives the selection of the reference object region based on designation of a user from among the plurality of displayed object regions.

[3] The image processing device according to [1] or [2], may have a configuration in which the second image feature quantity includes a plurality of feature quantities and weights of the plurality of feature quantities, and the image processing device further includes a weight setting unit that sets the weight of each of a plurality of feature quantities included in the second image feature quantity based on classification determined based on analysis result of the captured images.

[4] The image processing device according to [3], may have a configuration in which the plurality of feature quantities are feature quantities representing the features of the sample.

[5] The image processing device according to any one of [1] to [4], may have a configuration in which the target cell is a nucleated red blood cell having a nucleus, the image processing device further includes an extraction unit which extracts a nucleus candidate region to be a candidate of the nucleus from the plurality of captured images based on at least one of the color and concentration of the nucleus, and the setting unit sets the object regions based on the nucleus candidate region and a range of possible size of the target cell.

[6] According to another aspect of the invention, it provides a program which causes a computer to function as: an acquisition unit that acquires captured images obtained by imaging a sample including a target cell; a learning unit that mechanically learns a condition for identifying the target cell based on a first image feature quantity calculated in a sample image corresponding to each of a positive example and a negative example of the target cell; a setting unit that sets a plurality of object regions for detecting the target cell in the captured images; a first display control unit that performs display control of the plurality of object regions in an order determined based on the first image feature quantity of each of the plurality of object regions; a calculation unit that calculates a second image feature quantity different from the first image feature quantity in the plurality of object regions; and a second display control unit that sorts the plurality of displayed object regions in an order of a second image feature quantity similar to a second image feature quantity of a reference object region selected from among the plurality of object regions and performs display control of the plurality of object regions.

[7] According to another aspect of the invention, it provides an image processing method which causes a computer to execute a process including: acquiring captured images obtained by imaging a sample including a target cell; mechanically learning a condition for identifying the target cell based on a first image feature quantity calculated in a sample image corresponding to each of a positive example and a negative example of the target cell; setting a plurality of object regions for detecting the target cell in the captured images; performing display control of the plurality of object regions in an order determined based on the first image feature quantity of each of the plurality of object regions; calculating a second image feature quantity different from the first image feature quantity in the plurality of object regions; and sorting the plurality of displayed object regions in an order of a second image feature quantity similar to a second image feature quantity of a reference object region selected from among the plurality of object regions and performing display control of the plurality of object regions.

[8] According to another aspect of the invention, it provides a non-transitory computer readable medium storing a program causing a computer to execute a process for image processing, the process including: acquiring captured images obtained by imaging a sample including a target cell; mechanically learning a condition for identifying the target cell based on a first image feature quantity calculated in a sample image corresponding to each of a positive example and a negative example of the target cell; setting a plurality of object regions for detecting the target cell in the captured images; performing display control of the plurality of object regions in an order determined based on the first image feature quantity of each of the plurality of object regions; calculating a second image feature quantity different from the first image feature quantity in the plurality of object regions; and sorting the plurality of displayed object regions in an order of a second image feature quantity similar to a second image feature quantity of a reference object region selected from among the plurality of object regions and performing display control of the plurality of object regions.

[9] According to another aspect of the invention, it provides an image processing system including: an image processing device; an optical microscope that is connected to the image processing device; and a display device that is connected to the image processing device, in which the image processing device includes an acquisition unit that acquires captured images obtained by imaging a sample including a target cell, a unit that mechanically learns a condition for identifying the target cell based on a first image feature quantity calculated in a sample image corresponding to each of a positive example and a negative example of the target cell, a setting unit that sets a plurality of object regions for detecting the target cell in the captured images, a first display control unit that performs display control of the plurality of object regions in an order determined based on the first image feature quantity of each of the plurality of object regions, a calculation unit that calculates a second image feature quantity different from the first image feature quantity in the plurality of object regions, and a second display control unit that sorts the plurality of displayed object regions in an order of a second image feature quantity similar to a second image feature quantity of a reference object region selected from among the plurality of object regions and performs display control of the plurality of object regions.

Advantageous Effects of Invention

According to the configuration (processing) described in [1], [6], [7], [8], and [9], it becomes easy to confirm a candidate region similar to a reference candidate region in a feature to be not mechanically learned among a plurality of candidate regions of a target cell.

According to the configuration described in [2], it becomes easy to confirm a candidate region similar to a reference candidate region designated by the user.

According to the configuration described in [3], it becomes easy to confirm a candidate region similar to a reference candidate region in a feature set according to the feature of the sample.

According to the configuration described in [4], it becomes easy to confirm a candidate region similar to a reference candidate region among a plurality of candidate regions of a target cell after considering the feature of the sample.

According to the configuration described in [5], it becomes easy to confirm a candidate region similar to a reference candidate region in a feature to be not mechanically learned among a plurality of candidate regions of a nucleated red blood cell.

BRIEF DESCRIPTION OF DRAWINGS

FIG. 4A is a diagram illustrating classification processing of a specimen.

FIG. 4B is a diagram illustrating classification processing of a specimen.

FIG. 4C is a diagram illustrating classification processing of a specimen.

FIG. 5A is a diagram illustrating a first feature quantity.
FIG. 5B is a diagram illustrating a first feature quantity.
FIG. 5C is a diagram illustrating a first feature quantity.
FIG. 12 is a diagram showing an example of a list display screen of candidate images after sorting.

DESCRIPTION OF EMBODIMENTS

Figure 1:
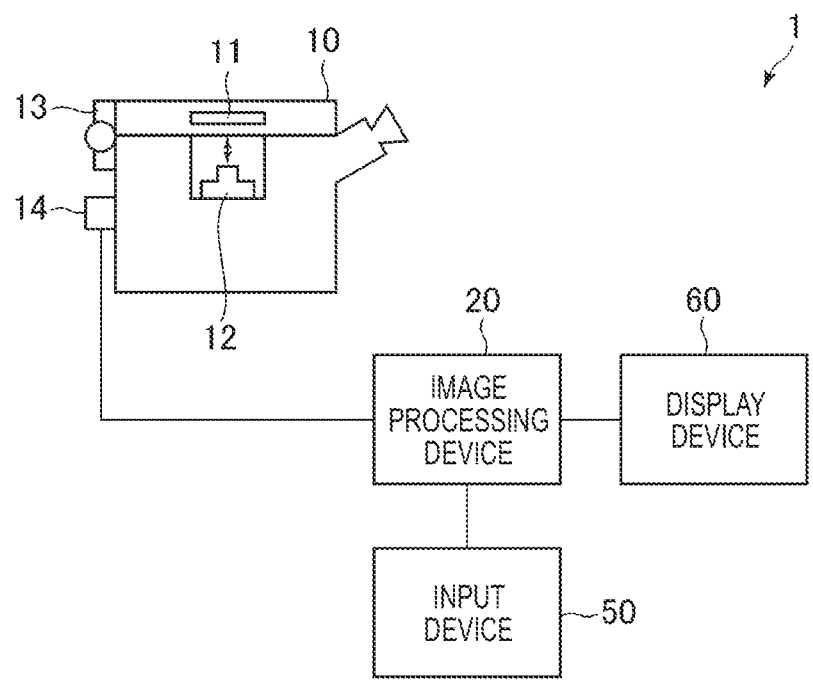
FIG. 1 is a diagram showing a system configuration example of an image processing system according to this embodiment.

Hereinafter, a mode (hereinafter, referred to as an embodiment) for carrying out the invention will be described referring to the drawings.

FIG. 1 shows a system configuration example of an image processing system 1 according to this embodiment. As shown in FIG. 1, the image processing system 1 includes an optical microscope 10, an image processing device 20, an input device 50, and a display device 60. The image processing device 20 and the optical microscope 10, the input device 50, and the display device 60 are connected to perform data communication.

The optical microscope 10 images a sample on a slide glass 11 placed on a sample stand by a CCD camera 14 through an optical system, such as an objective lens 12. The optical microscope 10 includes a focusing mechanism 13 which changes the distance between the slide glass 11 and the objective lens 12, and images the sample on the slide glass 11 while changing a focal distance. In this embodiment, as the sample, a sample in which maternal blood is applied to the slide glass 11 and May-Giemsa staining is performed is used. With this, nucleated red blood cells (NRBCs) derived from a fetus in maternal blood are stained violet-blue. Hereinafter, NRBCs are called target cells.

The image processing device 20 acquires captured images imaged by the optical microscope 10, detects candidate images of a target cell from the acquired captured images, and lists and displays the detected candidate image. The image processing device 20 sets an image selected from among the listed and displayed candidate images as a reference image and sorts and displays the candidate images in an order of similarity to the reference image. The details of the above-described processing in the image processing device 20 will be described below.

The input device 50 is, for example, a device, such as a keyboard or a mouse, and inputs an operation received from the user to the image processing device 20. For example, the image processing device 20 acquires information regarding an image region designated by the user through the input device 50 in an image displayed on the display device 60 as learning information for learning the image features of a positive example and a negative example of the target cell. The input device 50 receives an input from the user when selecting the reference image from among the listed and displayed candidate images of the target cell.

The display device 60 is, for example, a liquid crystal display or the like, and displays a screen on the basis of the result of processing by the image processing device 20. For example, the captured images imaged by the optical microscope 10, a list of target cells detected from the captured images, the sorting result of the list, and the like are displayed on the display device 60.

Next, a function of the image processing device 20 according to this embodiment will be described.

Figure 2:
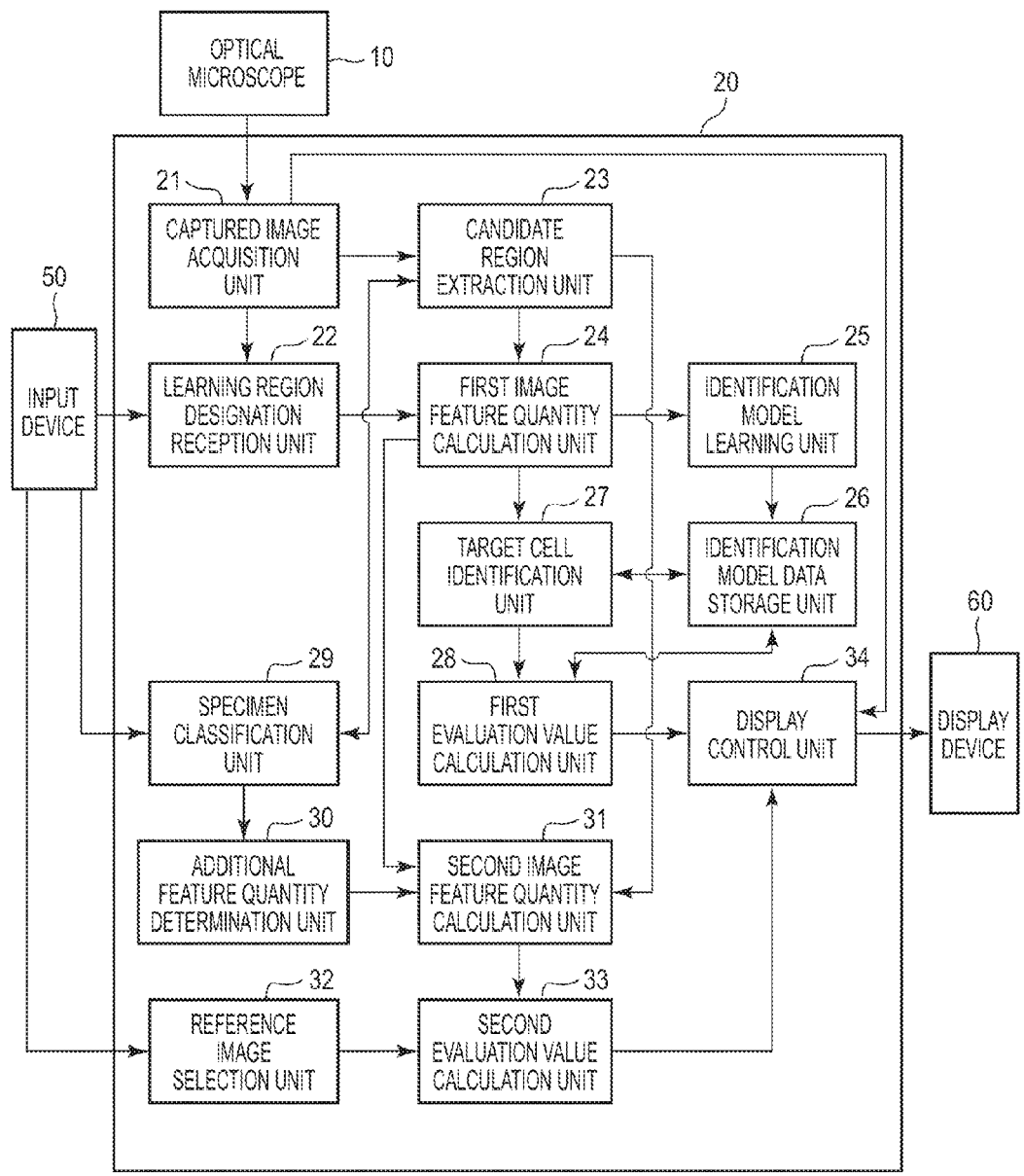
FIG. 2 is a functional block diagram of an image processing device.

FIG. 2 is a functional block diagram of the image processing device 20. As shown in FIG. 2, the image processing device 20 includes a captured image acquisition unit 21, a learning region designation reception unit 22, a candidate region setting unit 23, a first image feature quantity calculation unit 24, an identification model learning unit 25, an identification model data storage unit 26, a target cell identification unit 27, a first evaluation value calculation unit 28, a specimen classification unit 29, an additional feature quantity determination unit 30, a second image feature quantity calculation unit 31, a reference image selection unit 32, a second evaluation value calculation unit 33, and a display control unit 34.

The functions of the respective units in the image processing device 20 may be realized when a computer including control means, such as a CPU, storage means, such as a memory, input/output means for transmitting and receiving data to and from an external device, and the like reads and executes a program stored in a computer-readable information recording medium. It should be noted that the program may be supplied to the image processing device 20 as a computer by an information recording medium, such as an optical disk, a magnetic disk, a magnetic tape, a magneto-optical disk, or a flash memory, or may be supplied to the image processing device 20 through a data communication network, such as Internet.

The captured image acquisition unit 21 acquires captured images obtained by imaging the sample using the CCD camera 14 in the optical microscope 10 from the optical microscope 10. It should be noted that images acquired by the captured image acquisition unit 21 may be displayed on the display device 60 by the display control unit 34.

The learning region designation reception unit 22 receives the designation of an image region for use in learning processing in the images acquired by the captured image acquisition unit 21. The designation of the image region may be performed through the input device 50. For example, the learning region designation reception unit 22 receives an image region with a target cell shown in the captured images as a positive example and receives an image region with no target cell as a negative example when learning identification between the target cell (nucleated red blood cell) and other images. The learning region designation reception unit 22 may output an image cut based on the received image regions to the first image feature quantity calculation unit 24 along with identification information regarding whether the image is a positive example or a negative example.

The candidate region setting unit 23 sets a candidate region to be a candidate of the target cell inside the captured images acquired by the captured image acquisition unit 21. Hereinafter, a specific example of processing by the candidate region setting unit 23 will be described.

First, the candidate region setting unit 23 extracts a candidate region of a nucleus based on pixels having color (RGB value) or concentration within a predetermined range in each captured image acquired by the captured image acquisition unit 21. For example, the candidate region setting unit 23 may binarize the pixels in the captured image by a predefined threshold value of color (or concentration), and specifically, may extract pixels having color (or concentration) darker than the threshold value (equal to or greater than the threshold value) as a black pixel. The candidate region setting unit 23 may calculate a plurality of sets (pixel groups) by connecting the pixels extracted from each image acquired by the captured image acquisition unit 21 and may set a region circumscribed to each set as a nucleus candidate region.

Next, the candidate region setting unit 23 estimates the possible range of a cell size based on the projection size of the nucleus candidate region extracted by the candidate region setting unit 23 onto the slide glass surface and a predefined relational expression. For example, the candidate region setting unit 23 may estimate the possible range (for example, a rectangular region) of the nucleated red blood cell on the slide glass surface based on the relational expression between a nucleus in the nucleated red blood cell and a cell size. Specifically, the candidate region setting unit 23 sets the rectangular region in the estimated region centering on one point in the nucleus candidate region as a cell presence region.

The candidate region setting unit 23 determines a cell candidate region likely to include a target cell based on the nucleus candidate region extracted by the candidate region setting unit 23 and the cell presence region on the slide glass surface estimated by the candidate region setting unit 23, and outputs captured images in the determined cell candidate region to the first image feature quantity calculation unit 24.

The first image feature quantity calculation unit 24 enlarges or reduces the captured images input from the learning region designation reception unit 22 or the candidate region setting unit 23 to a designated image size and then calculates a first image feature quantity in the images. The first image feature quantity is an image feature quantity for learning and identification for use in learning processing by the identification model learning unit 25 and identification processing by the target cell identification unit 27, and for example, an HOG feature quantity may be used. For example, the HOG feature quantity may be calculated as follows. First, an object image is divided into B blocks each having A cells, luminance gradient direction histograms ([the value of a first gradient direction, the value of a second gradient direction, . . . , the value of an N-th gradient direction]) are obtained from the luminance gradient direction and luminance gradient intensity in the plane (X direction and Y direction) of an image for the respective cells of each block, and normalization is performed in units of blocks such that the square mean of the luminance gradient direction histograms becomes 1. Thereafter, A×N values created by combining the normalized luminance gradient direction histograms in the block are set as the feature quantities of the block, and A×B×N values created by combining all blocks in the object image are set as the HOG feature quantities of the object image.

When the captured images are input from the learning region designation reception unit 22, the first image feature quantity calculation unit 24 calculates the image feature quantity from the input captured images and then outputs the calculated image feature quantity to the identification model learning unit 25. When the captured images are input from the candidate region setting unit 23, the first image feature quantity calculation unit 24 calculates the image feature quantity from the input captured images and then outputs the calculated image feature quantity to the target cell identification unit 27.

The identification model learning unit 25 performs learning of the target cell identification unit 27 which performs identification of the target cell based on the first image feature quantity calculated by the first image feature quantity calculation unit 24 in the images of the positive example and the negative example received by the learning region designation reception unit 22. Specifically, the identification model learning unit 25 generates the model parameters of the target cell identification unit 27 with a first image feature quantity calculated in the captured images of the target cell as a positive example and a first image feature quantity calculated in other captured images as a negative example. It should be noted that a machine learning model, such as AdaBoost or Support Vector Machine, may be used for the target cell identification unit 27.

The identification model data storage unit 26 stores the model parameters of the target cell identification unit 27 generated by the identification model learning unit 25.

The target cell identification unit 27 identifies whether or not a cell included in a cell candidate region is a target cell based on the first image feature quantity calculated in the captured images related to the cell candidate region determined by the candidate region setting unit 23 and the model parameters related to the target cell identification unit 27 stored in the identification model data storage unit 26.

The first evaluation value calculation unit 28 calculates a first evaluation value for ranking in an order of higher possibility of a candidate image being a target cell based on the learned first image feature quantity and the first image feature quantity of the candidate image. For example, the first evaluation value calculation unit 28 may calculate the distance between the first image feature quantity of each of the candidate regions identified to be a target cell by the target cell identification unit 27 and a representative image feature quantity (the center or average of the first image feature quantities of the positive example) of the first image feature quantities of the learned positive example as the first evaluation value of the candidate region. The first evaluation value calculation unit 28 may calculate the distance between the first image feature quantity of each of the candidate regions identified to be a target cell by the target cell identification unit 27 and a hyperplane separating the first image feature quantity of the positive example and the first image feature quantity of the negative example as the first evaluation value of the candidate region.

The display control unit 34 can display a list of candidate images identified to be a target cell by the target cell identification unit 27 on the display device. Here, the display control unit 34 may sort and display a list of candidate images identified to be a target cell by the target cell identification unit 27 in an order of the first evaluation values of the candidate images. For example, when the first evaluation value is the distance from the representative image feature quantity of the positive example, the candidate images may be displayed in an order of shorter distance.

Figure 3A:
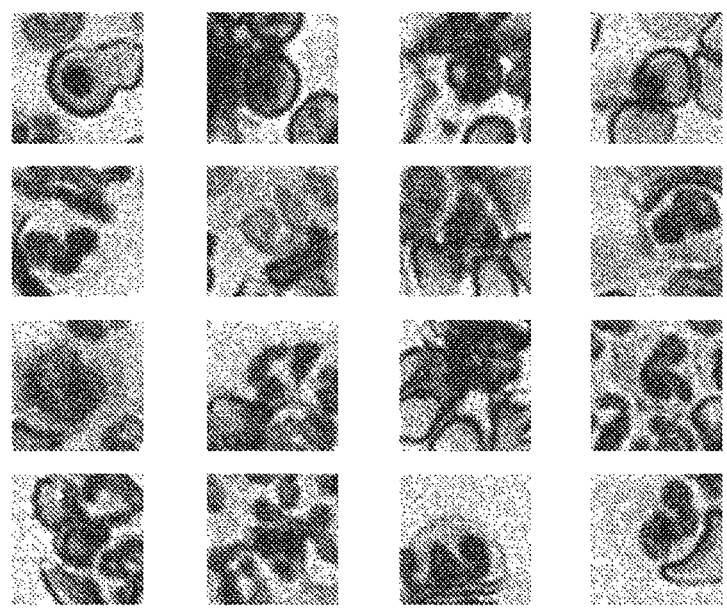
FIG. 3A is a diagram illustrating a classification of a specimen.
Figure 3B:
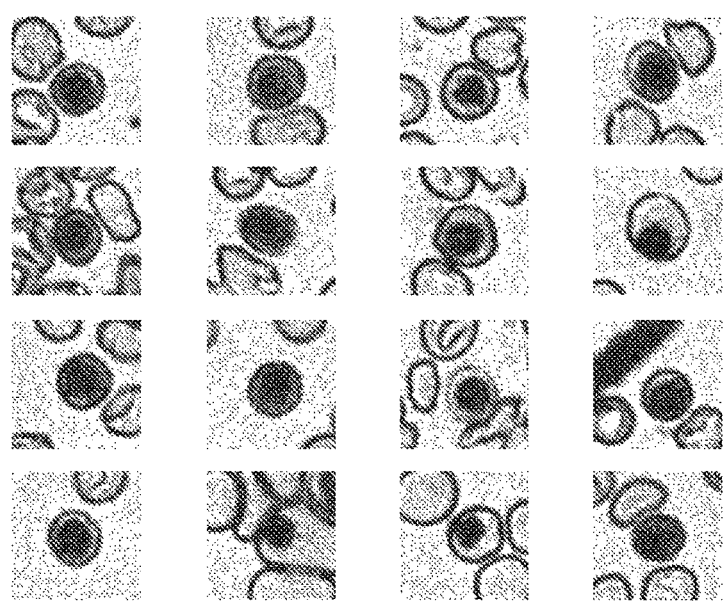
FIG. 3B is a diagram illustrating a classification of a specimen.
Figure 3C:
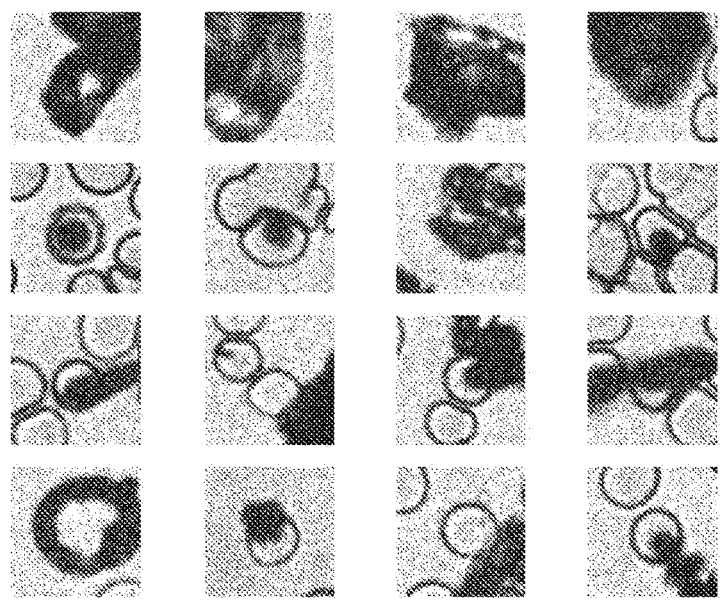
FIG. 3C is a diagram illustrating a classification of a specimen.

The specimen classification unit 29 analyzes the feature of a specimen corresponding to the captured image based on the captured image to be processed and classifies the specimen based on the analyzed feature. Specifically, as shown in FIGS. 3A to 3C, since an individual specimen has a tendency of a class (class A) having more neutrophils, a class (class B) having more lymphoid cells, or a class (class C) having more contaminants, or the like, the specimen classification unit 29 classifies whether or not the specimen corresponds to any class. FIG. 3A shows an example of a specimen having more neutrophils, FIG. 3B shows an example of a specimen having more lymphoid cells, and FIG. 3C shows an example of a specimen having more contaminants. Here, a neutrophil has the color of a nucleus similar to a nucleated red blood cell, but has a difference in that the nucleus is ramified. A lymphoid cell has a form similar to a nucleated red blood cell, but has a difference in that the color is lighter than the nucleated red blood cell. Hereinafter, an example of classification processing of a specimen will be described referring to FIGS. 4A to 4C.

The specimen classification unit 29 extracts a region (FIG. 4B) having concentration equal to or greater than specific concentration (for example, luminance of each of R, G, and B is equal to or less than 100) from the candidate region (FIG. 4A) and calculates the average value (color average value) of the luminance values of each of R, G, and B in the extracted region. Here, the specimen classification unit 29 obtains the frequency distribution (FIG. 4C) of the color average values concerning each candidate region. The specimen classification unit 29 determines that an image has less erroneous detection and does not correspond to any of the classes A to C when the frequency in the frequency distribution is not equal to or greater than 50. Meanwhile, the specimen classification unit 29 determines to be the class A having more neutrophils when the frequency in the frequency distribution is equal to or greater than 50 and when the cumulative frequency less than a threshold value is greater than the cumulative frequency equal to or greater than the threshold value with the threshold value (for example, 60 in B) of the color average value as a reference, and determines to be the class B having more lymphoid cells otherwise. The determination about whether or not to be the class C having more contaminants may be performed, for example, based on whether or not the size of a region having concentration equal to or greater than specific concentration is equal to or greater than a threshold value.

The additional feature quantity determination unit 30 determines an image feature quantity different from the first image feature quantity as an additional feature quantity in each of the candidate images including the candidate region. Each candidate image may be a region of a predetermined size including the candidate region. Hereinafter, an example of a feature quantity which is used as an additional feature quantity will be described.

A first feature quantity may be information representing the feature of a cell included in each of the candidate images. Specifically, the first feature quantity may be information, such as the size of a nucleus, the average value of the color of the nucleus, the area ratio of the nucleus and a cell membrane, the size of the cell membrane, and the thickness of the cell membrane. It should be note that, when the first feature quantity is the size of the nucleus, FIG. 5A shows an example of the first feature quantity of a specimen having more neutrophils, FIG. 5B shows an example of the first feature quantity of a specimen having more lymphoid cells, and FIG. 5C shows an example of the first feature quantity of a specimen having more contaminants.

Figure 6A:
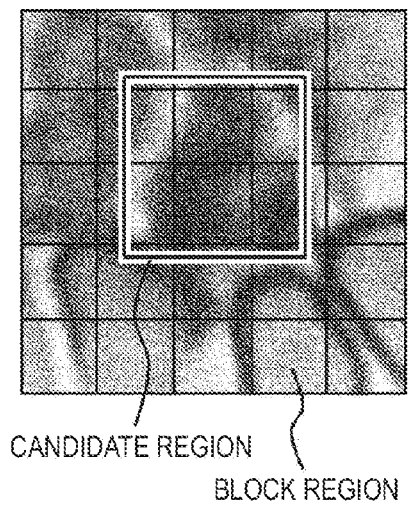
FIG. 6A is a diagram illustrating a second feature quantity.
Figure 6B:
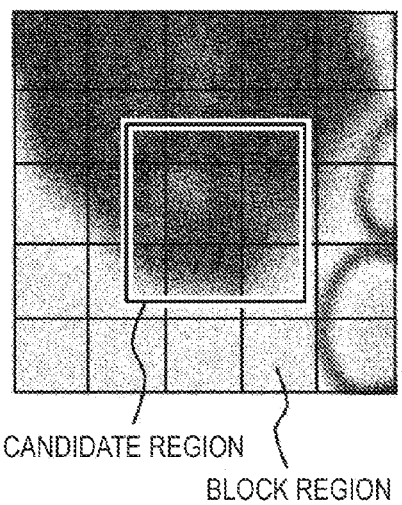
FIG. 6B is a diagram illustrating a second feature quantity.
Figure 6C:
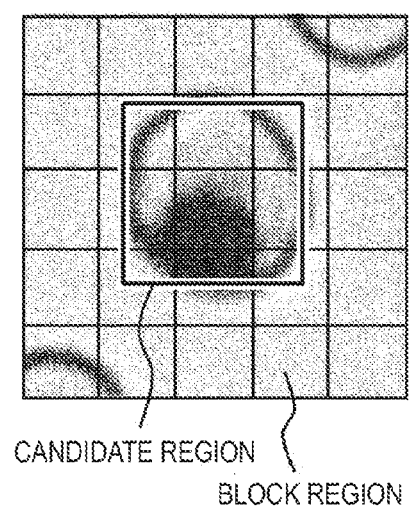
FIG. 6C is a diagram illustrating a second feature quantity.

A second feature quantity may be a feature quantity for distinguishing between a nucleated red blood cell and other cells. FIGS. 6A to 6C are diagrams illustrating an example of a second feature quantity. In the examples shown in FIGS. 6A to 6C, a plurality of block regions may be set in a candidate image including a candidate region, and color information (for example, information of 5×5×3 (RGB) dimension) of a plurality of set block regions may be a second feature quantity. It should be noted that FIG. 6A shows an example of the second feature quantity of a specimen having more neutrophils, FIG. 6B shows an example of the second feature quantity of a specimen having more contaminants, and FIG. 6C shows an example of the second feature quantity of a specimen having more lymphoid cells.

Figure 7A:
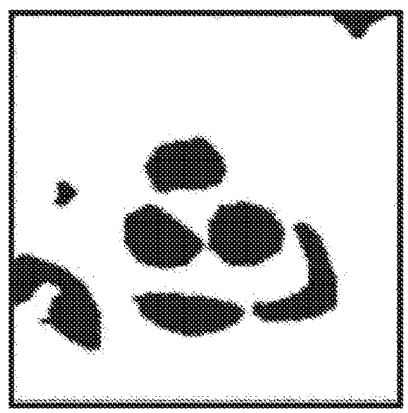
FIG. 7A is a diagram illustrating a third feature quantity.
Figure 7B:
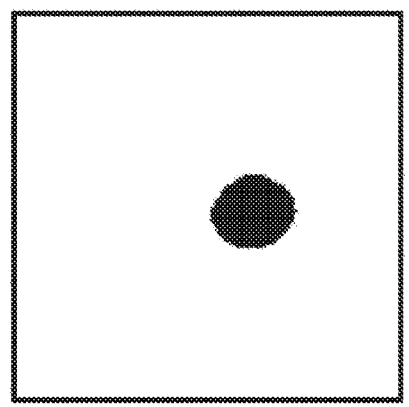
FIG. 7B is a diagram illustrating a third feature quantity.

A third feature quantity may be the number of nucleus candidate regions included in a candidate image. A nucleus candidate region may be a pixel group having concentration equal to or greater than given concentration in a candidate image. Here, FIGS. 7A to 7B are diagrams illustrating an example of a third additional feature quantity. FIG. 7A shows a neutrophil and FIG. 7B shows nucleated red blood cell. As will be apparent from the drawings, in case of a neutrophil, a plurality of nucleus candidate regions appear in a candidate image; however, in case of a nucleated red blood cell, one nucleus candidate region appears.

A fourth feature quantity may be a first evaluation value calculated by the first evaluation value calculation unit 28 for a candidate region included in a candidate image.

The additional feature quantity determination unit 30 may constitute an additional feature quantity using one of the first to fourth feature quantities or using two or more feature quantities among the first to fourth feature quantities in combination.

The second image feature quantity calculation unit 31 determines the configuration of the second image feature quantity based on the first image feature quantity, a plurality of additional feature quantities determined by the additional feature quantity determination unit 30, and the weights of the respective feature quantities, and calculates the second image feature quantity in each of the candidate images identified to be a target cell by the target cell identification unit 27. For example, when the first image feature quantity A, the additional feature quantities (first feature quantity B1, second feature quantity B2, third feature quantity B3, and fourth feature quantity B4), the weight Wa of A, and the weights Wb1 to Wb4 of B1 to B4, the second image feature quantity calculation unit 31 may generate the second image feature quantity as (Wa·A, Wb1·B1, Wb2·B2, Wb3·B3, Wb4·B4). Here, although the weights Wa and Wb1 to Wb4 may be predefined, of these, Wb2 and Wb3 may be changed based on the classification result by the specimen classification unit 29. Specifically, when it is classified into the class A having more neutrophils by the specimen classification unit 29, the value of Wb2 may be set to be greater than a predetermined value or other weights, and when it is classified into the class B having more lymphoid cells by the specimen classification unit 29, the value of Wb3 may be set to be greater than a predefined value or other weights. Of course, if at least one of Wb1 to Wb4 is not 0, other weights may be set to 0.

The reference image selection unit 32 receives the selection of a candidate image to be a reference of a target cell from among a list of candidate images identified to be a target cell by the target cell identification unit 27 through the input device and selects the received candidate image as a reference image.

The second evaluation value calculation unit 33 calculates the distance between the second image feature quantity calculated by the second image feature quantity calculation unit 31 in the reference image selected by the reference image selection unit 32 and the second image feature quantity calculated by the second image feature quantity calculation unit 31 in each of other candidate images as a second evaluation value of each of the candidate images.

The display control unit 34 may sort and display the list of candidate images identified to be a target cell by the target cell identification unit 27 in an order of the second evaluation values of the candidate images. For example, when the second evaluation value is the distance from the second image feature quantity of the reference image, the candidate images may be displayed in an order of shorter distance.

Next, the flow of processing in the image processing device 20 will be described referring to the flowcharts shown in FIGS. 8 to 10.

[Learning Processing]

Figure 8:
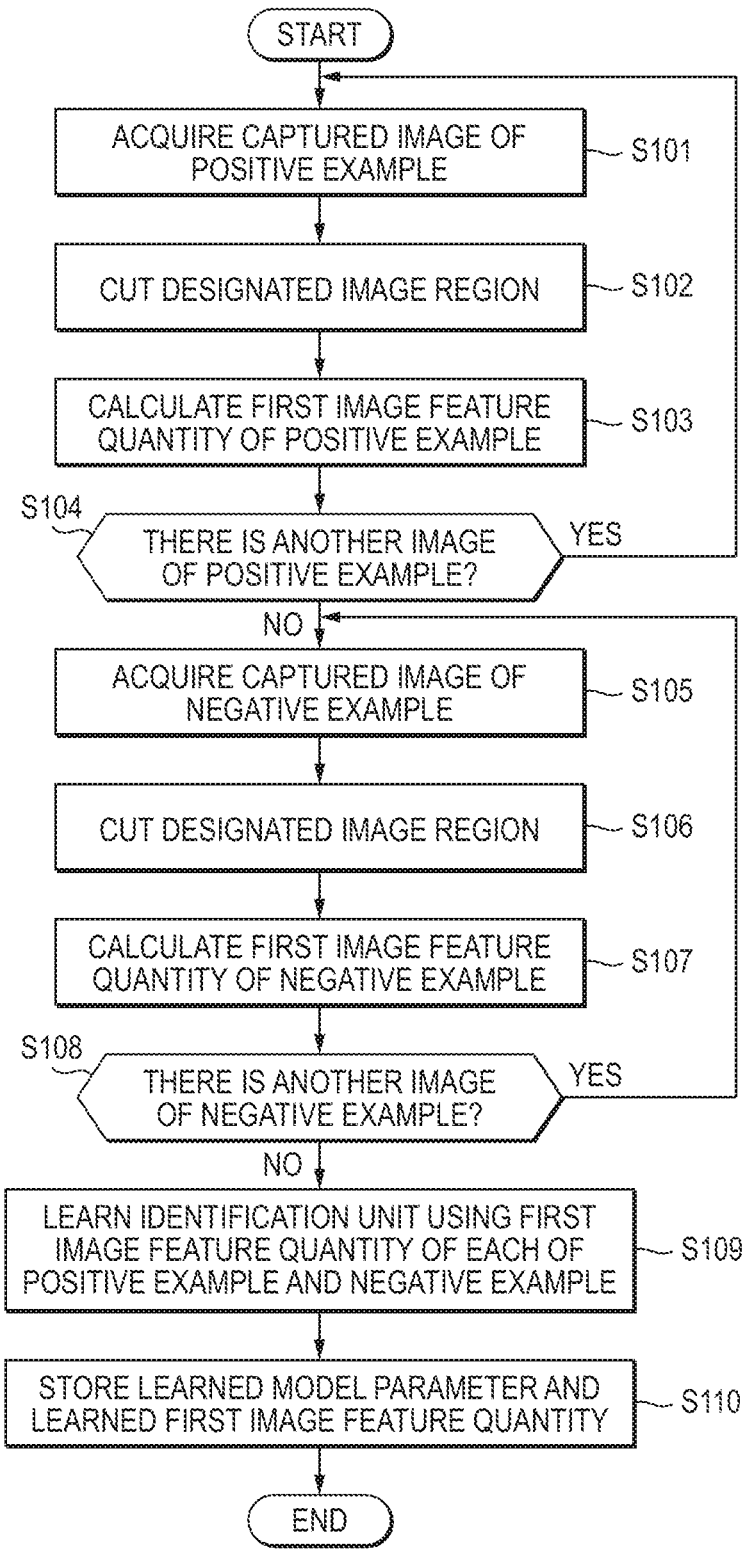
FIG. 8 is a flowchart relating to learning processing of an identification unit.

FIG. 8 is a flowchart relating to learning processing of an identification unit. As shown in FIG. 8, the image processing device 20 acquires a captured image (that is, an image including a target cell) of a positive example (S101), and cuts an image region (that is, an image region corresponding to the target cell) designated in the acquired captured image (S102). The image processing device 20 calculates the first image feature quantity of the positive example based on the cut image region of the captured image (S103). The first image feature quantity may be, for example, an HOG feature quantity. When there is another image of the positive example to be learned (S104: Y), the image processing device 20 returns to S101, and when there is no another image of the positive example to be learned (S104: N), the image processing device 20 progresses to S105.

The image processing device 20 acquires a captured image (that is, an image including a cell other than a target cell) of a negative example (S105), and cuts an image region (that is, an image region corresponding to the cell of the negative example) designated in the acquired captured image (S106). The image processing device 20 calculates the first image feature quantity of the negative example based on the cut image region of the captured image (S107). When there is another image of a negative example to be learned (S108: Y), the image processing device 20 returns to S105, and when there is no another image of the negative example (S108: N), the image processing device 20 progresses to S109.

The image processing device 20 executes learning processing of an identification unit identifying a target cell using the first image feature quantity of the positive example and the first image feature quantity of the negative example obtained by the above-described processing (S109), stores model parameters of the identification unit obtained by the learning processing (S110), and ends the learning processing.

[Flow of Detection Processing of Target Cell]

Next, the flow of processing for detecting a target cell from a captured image will be described referring to the flowcharts shown in FIGS. 9 and 10.

Figure 9:
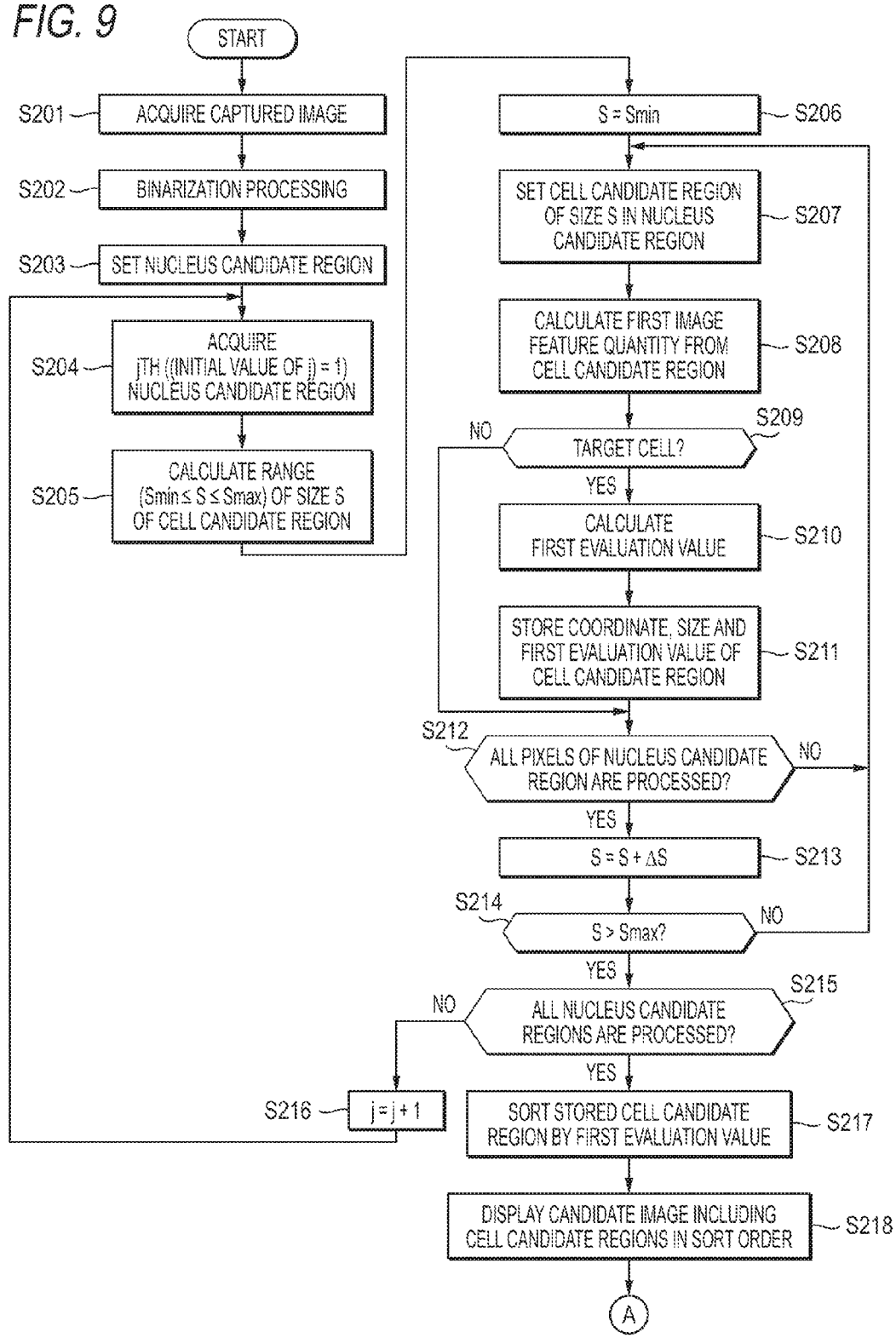
FIG. 9 is a flowchart of processing for detecting a target cell from a captured image.

As shown in FIG. 9, the image processing device 20 acquires captured images to be processed (S201), and performs binarization processing on the acquired captured images (S202). Next, the image processing device 20 sets nucleus candidate regions (the number of nucleus candidate regions is N) to be the nucleus of a target cell in the captured images after the binarization processing (S203).

The image processing device 20 acquires a j-th nucleus candidate region where the initial value of the variable j is 1 (S204), and calculates the possible range (Smin≤S≤Smax) of a cell size S based on the projection size of the acquired nucleus candidate region onto the slide glass surface and a predefined relational expression (S205).

The image processing device 20 sets the initial value of S to the minimum value (Smin) (S206), and sets the cell candidate region of the size S in the j-th nucleus candidate region (S207). The image processing device 20 calculates the first image feature quantity based on the captured image in the cell candidate region (S208), and performs determination about whether or not to be the target cell (nucleated red blood cell) by the target cell identification unit 27 based on the calculated first image feature quantity (S209).

When it is determined to be the target cell (S209: Y), the image processing device 20 calculates the first evaluation value for the cell candidate region by the first evaluation value calculation unit 28 (S210), and stores the coordinate, size, and first evaluation value of the cell candidate region (S211).

After S211 or when it is determined to be not the target cell (S209: N), the image processing device 20 progresses to S212. Here, when all pixels of the nucleus candidate region are not processed (S212: N), the image processing device 20 returns to S207 and continues the processing. When all pixels of the nucleus candidate region are processed (S212: Y), the image processing device 20 increases the size of the cell size S by ΔS (ΔS may be predefined or may be set by multiplying S by a predetermined ratio) (S213). When the cell size S is not greater than the maximum value (Smax) of the cell size (S214: N), the image processing device 20 returns to S207 and continues the processing.

When the cell size S is greater than the maximum value (Smax) of the cell size (S214: Y), the image processing device 20 performs determination about whether or not all nucleus candidate regions are processed (that is, whether or not j=N) (S215). When all nucleus candidate regions are not processed (S215: N), the image processing device 20 increments j (S216), returns to S204, and continues the processing. When all nucleus candidate regions are processed (S215: Y), the image processing device 20 sorts the stored cell candidate regions by the first evaluation value (S217), and lists and displays the candidate images including the cell candidate regions in a sort order (S218). FIG. 11 shows an example of a list display screen on which the candidate images are listed and displayed in a sort order of the first evaluation value. The processing after S218 will be described referring to the flowchart shown in FIG. 10.

Figure 10:
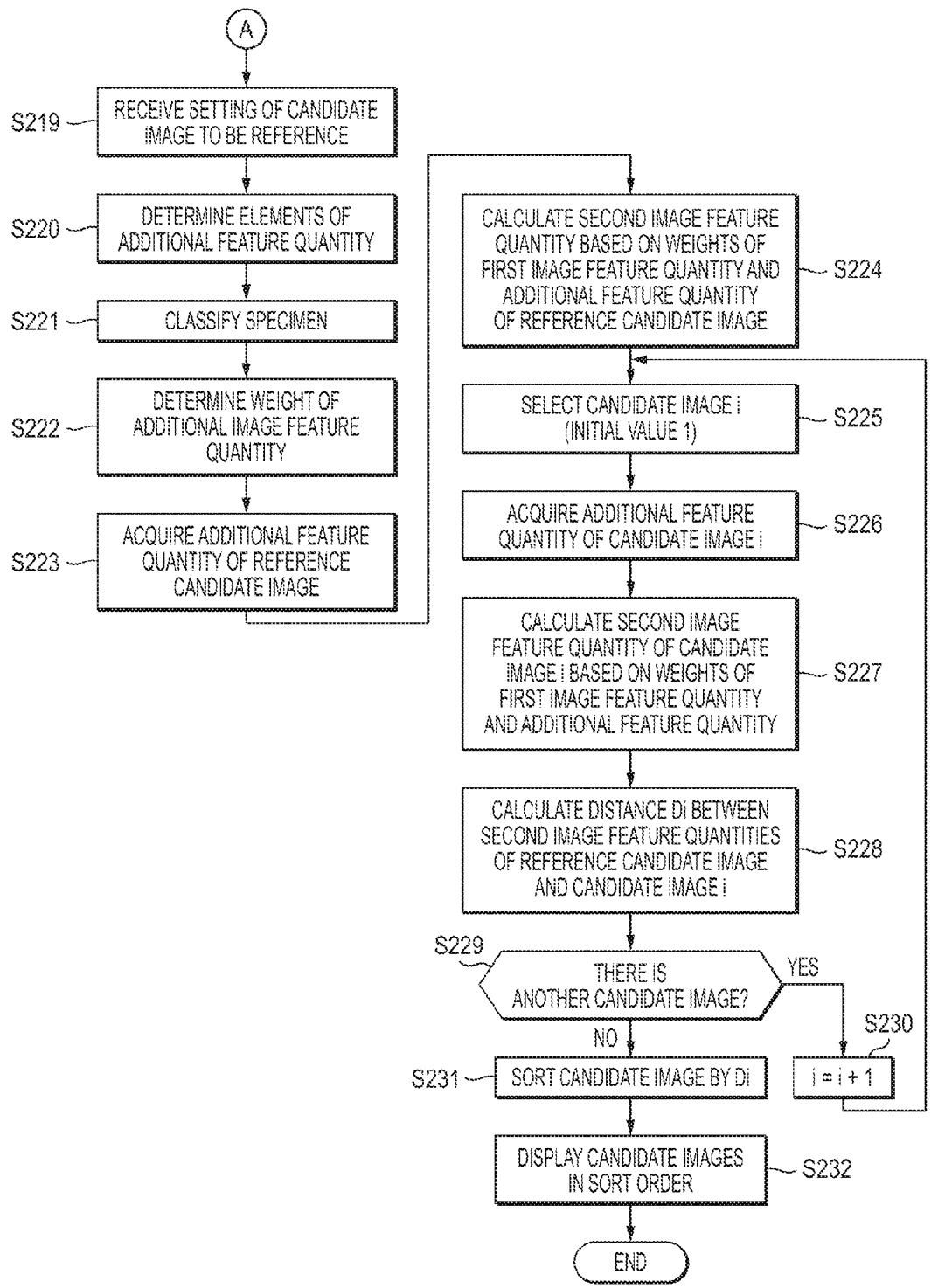
FIG. 10 is a flowchart of processing for detecting a target cell from a captured image.
Figure 11:
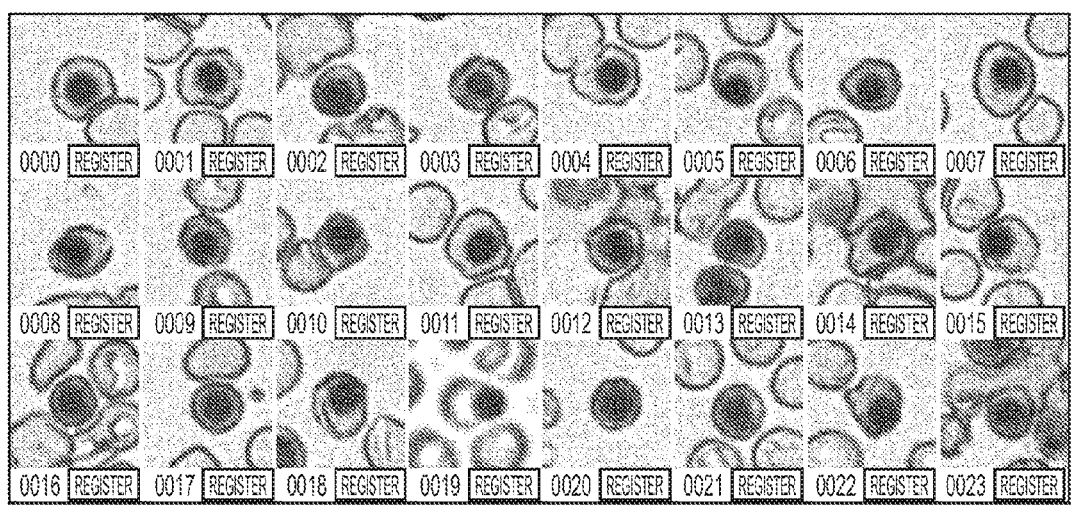
FIG. 11 is a diagram showing an example of a list display screen of candidate images.

As shown in FIG. 10, the image processing device 20 receives the designation of the reference image to be the reference of the target cell on the list display screen (S219).

The image processing device 20 determines the elements of the additional feature quantity by the additional feature quantity determination unit 30 (S220), classifies a specimen by the specimen classification unit 29 (S221), and determines the weight of a nucleus element of the additional feature quantity based on the classification of the specimen (S222).

The image processing device 20 acquires the additional feature quantity of the reference candidate image (S223), and calculates the second image feature quantity based on the first image feature quantity of the cell candidate region included in the reference candidate image, the additional feature quantity, and the weights of the respective feature quantities (S224).

Next, the image processing device 20 selects an unprocessed candidate image i (the initial value of i=1, 1≤i≤M) (S225), acquires the additional feature quantity of the candidate image i (S226), and calculates the second image feature quantity based on the first image feature quantity of the cell candidate region included in the candidate image i, the additional feature quantity, and the weights of the respective feature quantities (S227).

The image processing device 20 calculates the distance Di between the second image feature quantity of the reference candidate image and the second image feature quantity of the candidate image i as the second evaluation value (S228).

When there is an unprocessed candidate image (that is, when i is less than M) (S229: Y), the image processing device 20 increments i (S230), returns to S225, and continues the processing. When there is no unprocessed candidate image (that is, when i is M) (S229: N), the image processing device 20 sorts the processed candidate images in an order of the second evaluation value (S231), and displays a list of candidate images in a sort order (S232). FIG. 12 shows an example of a list display screen on which candidate images are listed and displayed in a sort order of the second evaluation value.

According to the image processing system 1 described above, it becomes easy to find a candidate region similar to the reference candidate region designated by the user from among the candidate regions of the target cell and the feature quantity in consideration of the individual feature of the specimen.

The invention is not limited to the above-described embodiment. For example, the classification of the specimen may be designated by the user, or after the image processing device 20 displays the histograms (FIG. 4C) based on the analysis result of the specimen on the display device 60, the designation of the classification of the specimen may be received from the user. The target cell is not limited to NRBCs, and other cells may be used as the target cell.

INDUSTRIAL APPLICABILITY

The image processing device, the image processing method, the computer-readable medium, and the image processing system according to the invention are useful for mechanically detecting cells, such as NRBCs.

Although the invention has been described in detail or referring to the specific embodiment, it is apparent to those skilled in the art that various changes and modifications can be added without departing from the spirit and scope of the invention.

This application is based on Japanese Patent Application No. 2012-184105, filed on Aug. 23, 2012, the content of which is incorporated herein by reference.

REFERENCE SIGNS LIST

1: image processing system, 10: optical microscope, 11: slide glass, 12: objective lens, 13: focusing mechanism, 14: CCD camera, 20: image processing device, 21: captured image acquisition unit, 22: learning region designation reception unit, 23: candidate region setting unit, 24: first image feature quantity calculation unit, 25: identification model learning unit, 26: identification model data storage unit, 27: target cell identification unit, 28: first evaluation value calculation unit, 29: specimen classification unit, 30:

additional feature quantity determination unit, 31: second image feature quantity calculation unit, 32: reference image selection unit, 33: second evaluation value calculation unit, 34: display control unit, 50: input device, 60: display device

The invention claimed is:

1. An image processing apparatus comprising:
at least one processor configured to execute:
a setting unit that sets a plurality of object regions for detecting a target cell in each of captured images obtained by imaging a sample including the target cell;
a first display control unit that performs display control of at least a part of the set plurality of object regions in a first order determined using a first image feature quantity calculated in each of the set plurality of object regions,
wherein the at least one processor is configured to use the first image feature quantity in a machine learning process for identifying the target cell; and
a second display control unit that performs display control of at least a part of the set plurality of object regions in a second order determined using similarities of a second image feature quantity calculated in each of the set plurality of object regions relative to the second image feature quantity calculated in a reference object region selected from at least a part of the set plurality of object regions subjected to the display control of the first display control unit,
wherein the machine learning process for identifying the target cell is performed without using a feature quantity included in the second image feature quantity.

2. The image processing apparatus according to claim 1, wherein the at least one processor is further configured to execute:
a reception unit that receives the selection of the reference object region using designation of a user from among at least a part of the set plurality of object regions subjected to the display control of the first display control unit.

3. The image processing apparatus according to claim 1, wherein the second image feature quantity includes a plurality of feature quantities and weights of the plurality of respective feature quantities, and
wherein the at least one processor is configured to execute:
a classification unit that classifies the sample into one of a plurality of classifications using image features of the captured images; and
a weight setting unit that sets the weights of a plurality of respective feature quantities included in the second image feature quantity calculated in each of the set plurality of object regions using the classification of the sample by the classification unit.

4. The image processing apparatus according to claim 3, wherein the second image feature quantity calculated in one object region of the set plurality of object regions is calculated using:
a plurality of feature quantities including:
the first image feature quantity calculated in the one object region; and
at least one feature quantity different from the first image feature quantity of the one object region; and
the weight of each of the plurality of feature quantities.

5. The image processing apparatus according to claim 4, wherein, when frequency of one color average value in a frequency distribution of color average values of regions determined to be equal to or greater than specific concentration in the captured images is equal to or greater than a first threshold value, the classification unit classifies the sample in a first classification when cumulative frequency of the color average less than a second threshold value is greater than cumulative frequency thereof equal to or greater than the second threshold value and classifies the sample in a second classification when the cumulative frequency of the color average less than the second threshold value is equal to or less than the cumulative frequency thereof equal to or greater than the second threshold value,
wherein the plurality of feature quantities include the first feature quantity using color information of each of a plurality of block regions obtained by dividing a candidate region including the object region and the second feature quantity using the number of pixel groups obtained by connecting pixels having color or concentration within a predefined range in the candidate image, and
wherein the weight setting unit sets the weight of the first feature quantity to be greater than the weight of the second feature quantity when the sample is in the first classification and sets the weight of the second feature quantity to be greater than the weight of the first feature quantity when the sample is in the second classification.

6. The image processing apparatus according to claim 1, wherein the target cell is a nucleated red blood cell having a nucleus,
wherein the at least one processor is further configured to execute an extraction unit that extracts a nucleus candidate region to be a candidate of the nucleus from the plurality of captured images using at least one of color and concentration of the nucleus, and
wherein the setting unit sets the object region using the nucleus candidate region and a range of possible size of the target cell.

7. An image processing method which causes at least one processor to execute a process comprising:
setting a plurality of object regions for detecting a target cell in each of captured images obtained by imaging a sample including the target cell;
performing first display control of at least a part of the set plurality of object regions in a first order determined using a first image feature quantity calculated in each of the set plurality of object regions,
wherein the at least one processor uses the first image feature quantity in a machine learning process for identifying the target cell; and
performing second display control of at least a part of the set plurality of object regions in a second order determined using similarities of a second image feature quantity calculated in each of the set plurality of object regions relative to the second image feature quantity calculated in a reference object region selected from at least a part of the set plurality of object regions subjected to the first display control,
wherein the machine learning process for identifying the target cell is performed without using a feature quantity included in the second image feature quantity.

8. A non-transitory computer readable medium storing a program causing at least one processor to execute a process for image processing, the process comprising:
setting a plurality of object regions for detecting a target cell in each of captured images obtained by imaging a sample including the target cell;

performing first display control of at least a part of the set plurality of object regions in a first order determined using a first image feature quantity calculated in each of the set plurality of object regions,
   wherein the at least one processor uses the first image feature quantity in a machine learning process for identifying the target cell; and performing second display control of at least a part of the plurality of the set object regions in a second order determined using similarities of a second image feature quantity calculated in each of the set plurality of object regions relative to the second image feature quantity calculated in a reference object region selected from at least a part of the set plurality of object regions subjected to the first display control,
   wherein the machine learning process for identifying the target cell is performed without using a feature quantity included in the second image feature quantity.

9. An image processing system comprising:

an image processing device;

an optical microscope that is connected to the image processing device; and a display device that is connected to the image processing device, wherein the image processing device includes at least on processor configured to execute:

a setting unit that sets a plurality of object images for detecting a target cell in each of captured images obtained by imaging a sample including the target cell;

a first display control unit that performs display control of at least a part of the set plurality of object regions in a first order determined using a first image feature quantity calculated in each of the set plurality of object regions,
   wherein the at least one processor is configured to use the first image feature quantity in a machine learning process for identifying the target cell; and a second display control unit that performs display control of at least a part of the set plurality of object regions in a second order determined using similarities of a second image feature quantity calculated in each of the set plurality of object regions relative to the second image feature quantity calculated in a reference object region selected from at least a part of the set plurality of object regions subjected to the display control of the first display control unit,
   wherein the machine learning process for identifying the target cell is performed without using a feature quantity included in the second image feature quantity.

* * * * *